United States Patent
Sachdeva et al.

(10) Patent No.: US 12,443,717 B2
(45) Date of Patent: Oct. 14, 2025

(54) METHODS AND PROCESSES TO SECURELY UPDATE SECURE ELEMENTS

(71) Applicant: ASSA ABLOY AB, Stockholm (SE)

(72) Inventors: Kapil Sachdeva, Round Rock, TX (US); Sylvain Jacques Prevost, Austin, TX (US); Philip Hill, Cardiff (GB)

(73) Assignee: ASSA ABLOY AB, Stockholm (SE)

( * ) Notice: Subject to any disclaimer, the term of this patent is extended or adjusted under 35 U.S.C. 154(b) by 460 days.

(21) Appl. No.: 17/756,835

(22) PCT Filed: Nov. 13, 2020

(86) PCT No.: PCT/EP2020/082136
§ 371 (c)(1),
(2) Date: Jun. 3, 2022

(87) PCT Pub. No.: WO2021/110389
PCT Pub. Date: Jun. 10, 2021

(65) Prior Publication Data
US 2022/0414224 A1    Dec. 29, 2022

Related U.S. Application Data

(60) Provisional application No. 62/944,588, filed on Dec. 6, 2019.

(51) Int. Cl.
*G06F 21/44* (2013.01)
*G06F 21/57* (2013.01)
*G06F 21/60* (2013.01)

(52) U.S. Cl.
CPC ............ *G06F 21/572* (2013.01); *G06F 21/44* (2013.01); *G06F 21/602* (2013.01); *G06F 2221/033* (2013.01)

(58) Field of Classification Search
CPC ....... G06F 21/572; G06F 21/44; G06F 21/602
(Continued)

(56) References Cited

U.S. PATENT DOCUMENTS

| | | | |
|---|---|---|---|
| 2018/0082065 A1 | 3/2018 | Liu et al. | |
| 2018/0123804 A1* | 5/2018 | Smith | H04L 63/0428 |
| 2019/0356529 A1 | 11/2019 | Gulati | |

FOREIGN PATENT DOCUMENTS

| | | |
|---|---|---|
| CN | 114930327 | 8/2022 |
| JP | 2008118265 | 5/2008 |

(Continued)

OTHER PUBLICATIONS

"Canadian Application Serial No. 3,160,260, Response Filed Oct. 30, 2023 to Examiners Rule 86(2) Report mailed Jul. 11, 2023", 11 pages.

(Continued)

*Primary Examiner* — Vivek Srivastava
*Assistant Examiner* — Hien V Doan
(74) *Attorney, Agent, or Firm* — Schwegman Lundberg & Woessner, P.A.

(57) ABSTRACT

This disclosure describes techniques for updating firmware of a secure element. The techniques include operations comprising: receiving, by a gateway device, from a remote source, a firmware file; receiving, by a processing element implemented on the gateway device, ephemeral session specific key material for a first secure element implemented on the gateway device; dividing the firmware file into a plurality of data chunks; applying, by the processing element, the ephemeral session specific key material to a first data chunk of the plurality of data chunks to generate a first data packet; and sending, by the processing element, the first data packet to the first secure element.

19 Claims, 7 Drawing Sheets

(58) Field of Classification Search
USPC .......................................................... 726/22
See application file for complete search history.

(56) References Cited

FOREIGN PATENT DOCUMENTS

| JP | 2017017616 | 1/2017 |
|----|------------|--------|
| JP | 2023505251 | 2/2023 |
| JP | 7429780 | 1/2024 |
| JP | 2024028670 | 3/2024 |
| JP | 7583204 | 11/2024 |
| WO | 2018029893 | 2/2018 |
| WO | 2018222281 | 12/2018 |

OTHER PUBLICATIONS

"International Application Serial No. PCT/EP2020/082136, International Search Report mailed Jan. 18, 2021", 5 pgs.
"International Application Serial No. PCT/EP2020/082136, Written Opinion mailed Jan. 18, 2021", 5 pgs.
"International Application Serial No. PCT/EP2020/082136, International Preliminary Report on Patentability mailed Jun. 16, 2022", 7 pgs.
"European Application Serial No. 20807376.7, Response Filed Dec. 16, 2022 to Communication pursuant to Rules 161(1) and 162 EPC mailed Jun. 13, 2022", 13 pgs.
"Indian Application Serial No. 202217031274, First Examination Report mailed Jan. 18, 2023", 6 pgs.
"Canadian Application Serial No. 3,160,260, Examiners Rule 86(2) Report mailed Jul. 11, 2023", 3 pages.
"Indian Application Serial No. 202217031274, Response Filed Jul. 19, 2023 to First Examination Report mailed Jan. 18, 2023", with English claims, 19 pages.
"Japanese Application Serial No. 2022-533504, Notification of Reasons for Rejection mailed Aug. 1, 2023", with English translation, 10 pages.
"Japanese Application Serial No. 2022-533504, Response filed Oct. 27, 2023 to Notification of Reasons for Rejection mailed Aug. 1, 2023", with current English claims, 7 pages.
Kohei, Miki, "Proposal and Implementation Evaluation of Secure Beat for Automotive ECU", Using a Unique ID Generated from a PUF as a Trust Anchor, Cryptography and Information Security security symposium, (Jan. 23, 2018), 11 pgs.
"Korean Application Serial No. 10-2022-7022613, Response filed Jun. 26, 2024 to Notice of Preliminary Rejection mailed Apr. 26, 2024", with English claims, 13 pages.
"Japanese Application Serial No. 2024-191738, Voluntary Amendment filed Nov. 25, 2024", with English claims, 19 pages.
"Korean Application Serial No. 10-2022-7022613, Notice of Preliminary Rejection mailed Apr. 26, 2024", with English translation, 7 pages.
"Mexican Application Serial No. MX/a/2022/006793, Office Action mailed Mar. 24, 2025", with manual English translation, 7 pages.
"Canadian Application Serial No. 3,160,260, Examiners Rule 86(2) Report mailed Jun. 11, 2025", 4 pgs.
"Mexican Application Serial No. MX a 2022 006793, Response Filed Jun. 2, 2025 to Office Action mailed Mar. 24, 2025", with English claims, 17 pages.

* cited by examiner

METHODS AND PROCESSES TO SECURELY UPDATE SECURE ELEMENTS

PRIORITY APPLICATION

This application is a U.S. National Stage filing under 35 U.S.C. § 371 of PCT Patent Application No. PCT/EP2020/082136, filed on Nov. 13, 2020, which claims priority to U.S. Provisional Application Ser. No. 62/944,588, filed Dec. 6, 2019, the disclosure of which are incorporated herein in their entirety by reference.

FIELD OF THE DISCLOSURE

This document pertains generally, but not by way of limitation, to a gateway that includes one or more secure elements.

BACKGROUND

Secure elements are typically used in many applications. Secure elements include hardware and/or software for performing cryptographic functions or processes—e.g., encryption, decryption, signature generation, signature verification, and/or key generation. Secure elements are contained within an explicitly defined perimeter that establishes the physical bounds of the cryptographic module and that contains any processors and/or other hardware components that store and protect any software and firmware components of the cryptographic module. Secure elements could take the form of (or include) a secure crypto-processor, a smart card, a secure digital (SD) card, a micro SD card, a SIM card, and/or any other cryptographic module.

The secure element (SE) is a tamper-resistant platform capable of securely hosting applications and their confidential and cryptographic data in accordance with the rules and security requirements set forth by a set of well-identified trusted authorities. The SE can be considered to be a chip that offers a dynamic environment to store data securely, process data securely and perform communication with external entities securely.

SUMMARY OF THE DISCLOSURE

In some certain embodiments, a system and method are provided for updating firmware of a secure element. In some embodiments, the system and method include a gateway that receives, from a remote source, a firmware file. A processing element implemented on the gateway device receives ephemeral session specific key material for a first secure element implemented on the gateway device. The firmware file is divided into a plurality of data chunks. The processing element applies the ephemeral session specific key material to a first data chunk of the plurality of data chunks to generate a first data packet and sends the first data packet to the first secure element.

In some implementations, the ephemeral session specific key material comprises an encryption key and a signature key, the encryption key being used to encrypt underlying data and the signature key being used to sign the encrypted data.

In some implementations, the first data packet is generated by encrypting and signing the first data chuck using the encryption key and the signature key in the ephemeral session specific key material.

In some implementations, the applying and sending operations for each of the plurality of data chunks are repeated.

In some implementations, the processing element comprises a security enclave. In such cases, the ephemeral session specific key material is established between the first secure element and the remote source, the establishing being performed based on a master firmware key pair associated with the first secure element, wherein the firmware file is divided by the processing element.

In some implementations, the security enclave is a trusted execution environments device, and wherein the master firmware key pair is stored on the remote source.

In some implementations, a processing element key pair is established between the remote source and the processing element. The ephemeral session specific key material is sent from the remote source to the processing element using the processing element key pair.

In some implementations, the processing element comprises a security enclave. In such cases, a processing element key pair is established between the first secure element and the processing element. The ephemeral session specific key material is sent from the first secure element to the processing element using the processing element key pair.

In some implementations, the processing element comprises a security enclave and the firmware file is divided by the processing element. In such cases, the processing element selects a second secure element as a manager and the first secure element as a target. The ephemeral session specific key material is established between the first secure element and the second secure element, the establishing being performed based on a first master firmware key pair associated with the first secure element. A processing element key pair is established between the second secure element and the processing element. The ephemeral session specific key material is sent from the second secure element to the processing element using the processing element key pair.

In some implementations, the security enclave is a trusted execution environments device, wherein the first master firmware key pair is stored on the second secure element, and wherein a second master firmware key pair associated with the second secure element is stored on the first secure element.

In some implementations, firmware of the second secure element is updated after the firmware file is transmitted to the first secure element.

In some implementations, the ephemeral session specific key material is a first ephemeral session specific key material. In such cases, the processing element selects the second secure element as the target and the first secure element as the manager. A second ephemeral session specific key material is established between the first secure element and the second secure element, the establishing being performed based on a second master firmware key pair associated with the second secure element. A processing element key pair is established between the first secure element and the processing element. The second ephemeral session specific key material is sent from the first secure element to the processing element using the processing element key pair.

In some implementations, the processing element sends the first data packet to the second secure element based on the second ephemeral session specific key material.

In some implementations, the processing element comprises a second secure element, and the firmware file is divided by a processor on the gateway. In such cases, the processor receives the firmware file. The processor selects the second secure element as a manager and the first secure element as a target. The ephemeral session specific key material is established between the first secure element and the second secure element, the establishing being performed based on a first master firmware key pair associated with the first secure element. The first data chunk is provided from the processor to the second secure element. The second secure element is instructed to apply the ephemeral session specific key material to the first data chunk to send the first data packet, directly or indirectly, to the first secure element.

In some implementations, firmware of the second secure element is updated after the firmware file is transmitted to the first secure element.

In some implementations, the ephemeral session specific key material is a first ephemeral session specific key material. In such cases, the processor selects the second secure element as the target and the first secure element as the manager. A second ephemeral session specific key material is established between the first secure element and the second secure element, the establishing being performed based on a second master firmware key pair associated with the second secure element. The first data chunk is provided from the processor to the first secure element. The first secure element to apply the second ephemeral session specific key material to the first data chunk is instructed to send the first data packet, directly or indirectly, to the second secure element.

In some implementations, the processing element sends the first data packet to the second secure element based on the second ephemeral session specific key material.

Updating firmware of a secure element typically requires a remote server to know the key material of the secure element in order to be able to perform mutual authentication and generate session key pairs to provide the firmware update to the secure element. After the remote server performs mutual authentication with the secure element, the remote server has to split up the firmware update into chunks and encrypt each file chunk being sent to the secure element. The disclosed embodiments utilize a processing element, locally implemented on a gateway device, to receive firmware or firmware chunks from a remote source and to locally encrypt such firmware with ephemeral session specific key material to provide the encrypted firmware to the secure element. In this way, the processing and storage resources of the remote server that are used to update firmware of a secure element are reduced and security of the overall system is enhanced.

This overview is intended to provide an overview of subject matter of the present patent application. It is not intended to provide an exclusive or exhaustive explanation of the inventive subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
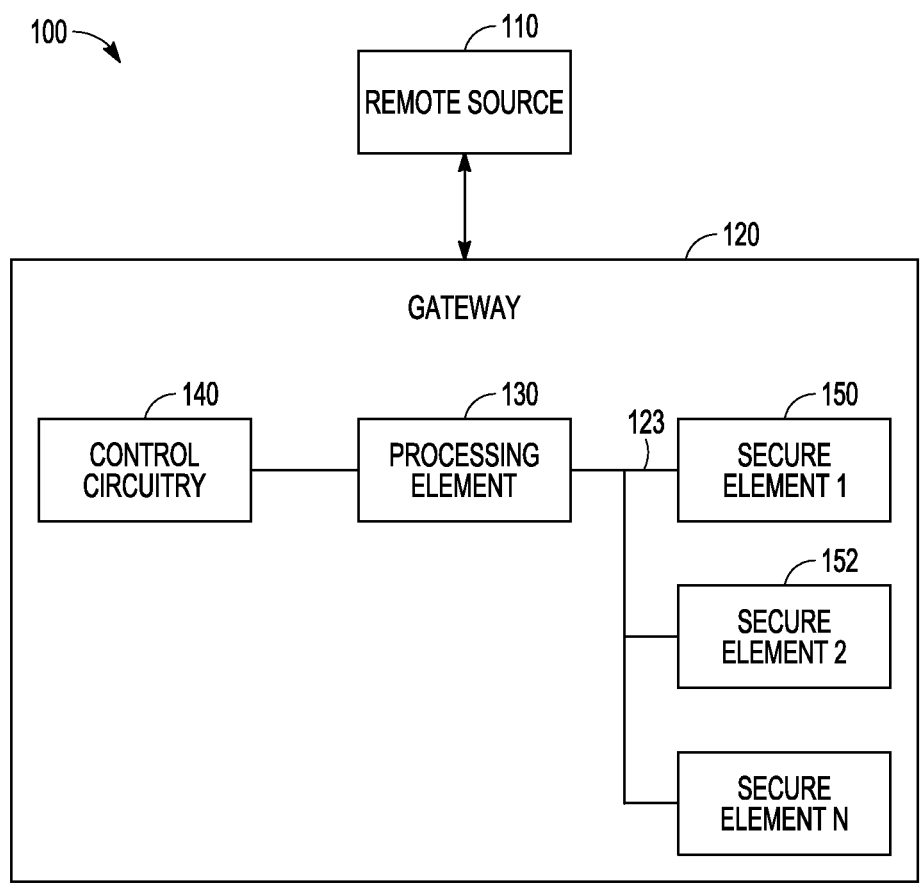
FIG. 1 is a block diagram of an example of a system for updating a secure element in accordance with various embodiments.

This disclosure describes, among other things, techniques for updating firmware of a secure element. Specifically, the disclosed techniques utilize a processing element, locally implemented on a gateway device, to receive firmware or firmware chunks from a remote source and to locally encrypt such firmware with ephemeral session specific key material to provide the encrypted firmware to the secure element. According to the disclosed embodiments, the processing and storage resources of the remote server that are used to update firmware of a secure element are thereby reduced and security of the overall system is enhanced. A device is considered a secure element if it provides a certain level of security assurances with respect to storage of sensitive key material and implementations of cryptographic algorithms. An example of a good secure element is a smart card that is used as a SIM card in mobile phones, a secure chip in credit/debit cards and user authentication devices in enterprises.

Secure elements are typically used in many applications. Typically, these secure elements are manufactured with a master encryption key and a master signature key specific to a particular one of the secure elements that are used to encrypt and sign firmware packets. These master encryption and signature keys (MFKP) are typically used to perform mutual authentication between two entities that know the value of the MFKP to generate session key pairs. As an example, a secure element can use its secure element specific MFKP to perform mutual authentication with another device that also knows the MFKP of the secure element. The mutual authentication can be performed without exchanging any key material between the devices. Once the mutual authentication is performed, session key pairs are generated and used by the secure element and the other device to encrypt and sign data exchanged between the two devices and decrypt the data. Once the session ends, the session key pairs are no longer valid and can be deleted.

In some cases, the firmware the secure elements use to operate needs to be updated. For example, the firmware may need to be updated to remove bugs and/or add/remove features. The firmware file for updating the secure elements is typically stored on a remote server, such as a cloud-based server or service. Updating the firmware of the secure element typically requires the remote server to know the MFKP of the secure element being updated in order to be able to perform mutual authentication and generate the session key pairs to provide the firmware update to the secure element. Also, because the storage resources available on the secure element are limited (e.g., the secure element cannot store more than one firmware file at a time and quite often even one firmware file), the updated firmware file needs to be sent to the secure element in several equal or non-equal chunks. As such, the remote server, not only has to know the MFKP of each secure element that is a target of the update, the remote server also has to divide the firmware file into chunks and encrypt the divided chunks to be sent to the target secure element. The typical process for updating the secure elements places a great deal of burden (both for processing and implementation of practices around secure key management) on the remote sources from which the updated firmware file is received and consumes a tremendous amount of processing and storage resources.

To address the shortcomings of such typical approaches, the disclosed techniques utilize a processing element, locally implemented on a gateway device, to receive firmware or firmware chunks from a remote source. The local processing element locally encrypts and signs such firmware with ephemeral session specific key material associated with a target secure element to provide the encrypted and signed firmware to the target secure element. In some cases, the local processing element receives the ephemeral session specific key material from the remote source. In some other cases, the local processing element receives the ephemeral session specific key material from the target secure element being updated or another secure element (that contains the MFKP of target secure element) on the gateway device. In this way, the processing, storage resources and secure key management requirements of the remote server, such as a cloud resource, are reduced and preserved to perform other functions. In addition, security of providing the updated firmware to the secure elements is not compromised.

While the below discussion pertains to "secure elements," the teachings of this disclosure are similarly applicable to any other suitable processing element, such as a general-purpose microprocessor. Namely, for illustrative purpose, the disclosure is discussed with respect to "secure elements" but any function performed below for updating the secure elements can be performed by other processors instead of (or in addition to) the secure elements.

FIG. 1 is a block diagram of an example of a system 100 for updating firmware of a secure element in accordance with various embodiments. System 100 includes a remote source 110 and a gateway 120. The remote source 110 may include one or more servers and may be accessible via a local area network or wide area network, such as the Internet. The remote source 110 includes a firmware file update for secure elements. In some embodiments, the gateway 120 communicates with the remote source 110 to obtain the firmware file update and to update the firmware file of one or more secure elements 150 and 152 implemented on the gateway 120. In some cases, rather than being a server accessible via a network, the remote source 110 may be another mobile device or storage device that includes and can provide a copy of the firmware file to the gateway 120.

The gateway 120 includes control circuitry 140, a processing element 130, and one or more secure elements 150 and 152. In some cases, the gateway 120 includes 16 secure elements. Each secure element 150 and 152 of gateway 120 is configured to perform the same function. In some implementations, secure elements 150 and 152 are implemented (both in hardware and software) to provide a higher level of security assurance than typical general-purpose microprocessors. In some implementations, secure elements 150 and 152 are implemented as general-purpose microprocessors without providing higher level of security assurance.

In some cases, each secure element 150 and 152 is manufactured with a different set of MFKP. As such, in order to communicate and exchange data with a first secure element 150, a given device (e.g., processing element 130) that knows the MFKP of the first secure element 150 performs mutual authentication with the first secure element 150 to generate an ephemeral session specific key material. The ephemeral session specific key material is used by the first secure element 150 and the given device to encrypt and sign packets of information. After the session ends between the given device and the first secure element 150, the ephemeral session specific key material becomes invalidated and/or deleted. Subsequence sessions and communications between the first secure element 150 and the given device may require that the given device and the first secure element 150 again perform mutual authentication using the MFKP of the first secure element 150 to generate a new ephemeral session specific key material.

In some embodiments, the remote source 110 updates the firmware of the first secure element 150 via a security enclave, such as a trusted execution environment, implemented by the processing element 130. In such cases, the security enclave may run applications that make use of crypto support and offer isolation from the general computing environment. In some implementations, the security enclave implemented by the processing element 130 includes symmetric or asymmetric key material that is used by the security enclave to communicate with another device. The cryptographic process and technique used by the security enclave to communicate with devices is different from the cryptographic process implemented by the secure elements of the gateway 120.

Specifically, the key material used by the security enclave is different from the MFKP of the first secure element 150. The key material used by the security enclave to communicate with other devices is referred to as TEEKP and includes an encryption key used to encrypted/decrypt data and a signature key used to sign the encrypted data. The process for updating the firmware of the first secure element 150 via the security enclave is illustrated in FIG. 2A.

Figure 2A:
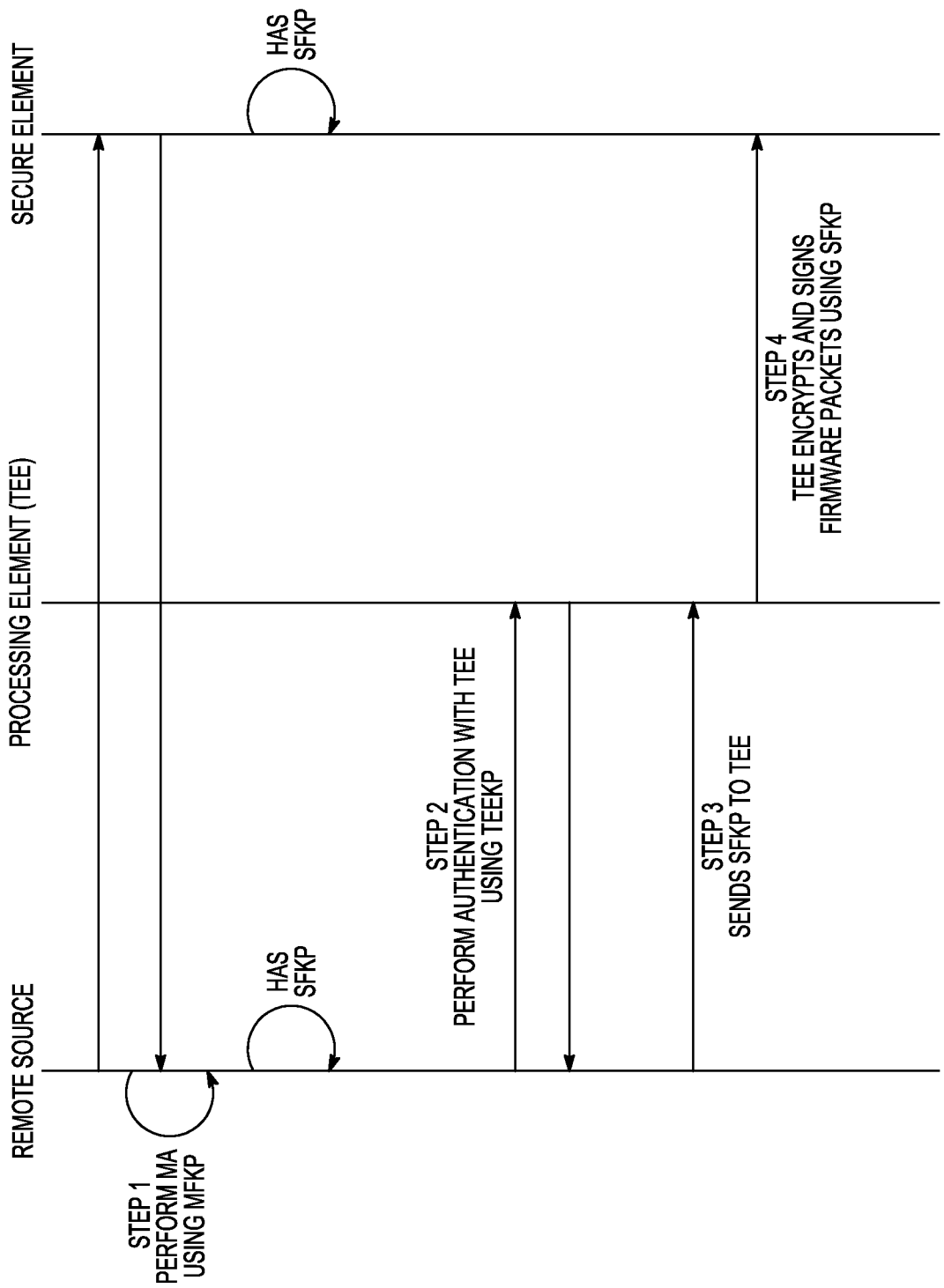
FIGS. 2A, 2B, 3 and 4 illustrate operations for updating a secure element in accordance with various embodiments.

As shown in FIG. 2A, initially the remote source 110 performs mutual authentication with the first secure element 150 using the MFKP of the first secure element 150. In this case, the remote source 110 needs to know the MFKP of the first secure element 150 that is the target of the firmware update. After performing mutual authentication with the first secure element 150, a pair of ephemeral session specific key material (SFKP) is generated and stored by the remote source 110 and the first secure element 150. After, before or concurrently with generating the SFKP, the remote source 110 performs authentication (e.g., mutual authentication) with the security enclave implemented by the processing element 130 using the TEEKP of the security enclave. At this point, the remote source 110 has the key material needed to communicate (exchange data with) the security enclave implemented by the processing element 130 and the SFKP needed to communicate with the first secure element 150.

According to this embodiment, the remote source 110 sends the SFKP of the first secure element 150 to the security enclave implemented by the processing element 130 using the TEEKP of the security enclave. Specifically, the remote source 110 encrypts and signs the SFKP of the first secure element 150 using the TEEKP of the security enclave implemented by the processing element 130. After the processing element 130 receives the SFKP from the remote source 110, the processing element 130 can decrypt the SFKP using the TEEKP and is then able to communicate with the first secure element 150 for the particular session using the decrypted SFKP of the first secure element 150. After, before, or concurrently with the remote source 130 transmitting the SFKP to the processing element 130, the remote source 130 also transmits the firmware file with the firmware update to the processing element 130. The firmware file may be sent in encrypted or non-encrypted form. If sent in encrypted form, the remote source 130 can encrypt the firmware file using the TEEKP of the security enclave implemented by the processing element 130. There are many other forms of secure exchange of firmware file (or chunks) that can be leveraged by the remote server and processing element. In some cases, the firmware file may be divided by the remote source 110 and sent to the processing element 130 in chunks from the remote source 110. In some cases, the firmware file may be sent in complete form from the remote source 110 and be completely stored on the processing element 130. In such cases, the processing element 130 divides the firmware file into chunks for transmission to the first secure element 150.

The security enclave implemented by the processing element 130 encrypts and signs each chunk of the firmware file using the SFKP of the first secure element 150 to generate respective data packets. The security enclave implemented by the processing element 130 provides the data packet (e.g., the encrypted and signed firmware file chunk) to the first secure element 150. The security enclave implemented by the processing element 130 repeats the process of encrypting and signing each chunk of the firmware file until all chunks have been sent to the first secure element 150. After all chunks of the firmware file are received by the first secure element 150, the SFKP becomes invalidated and/or deleted from being stored by the first secure element 150.

Figure 2B:
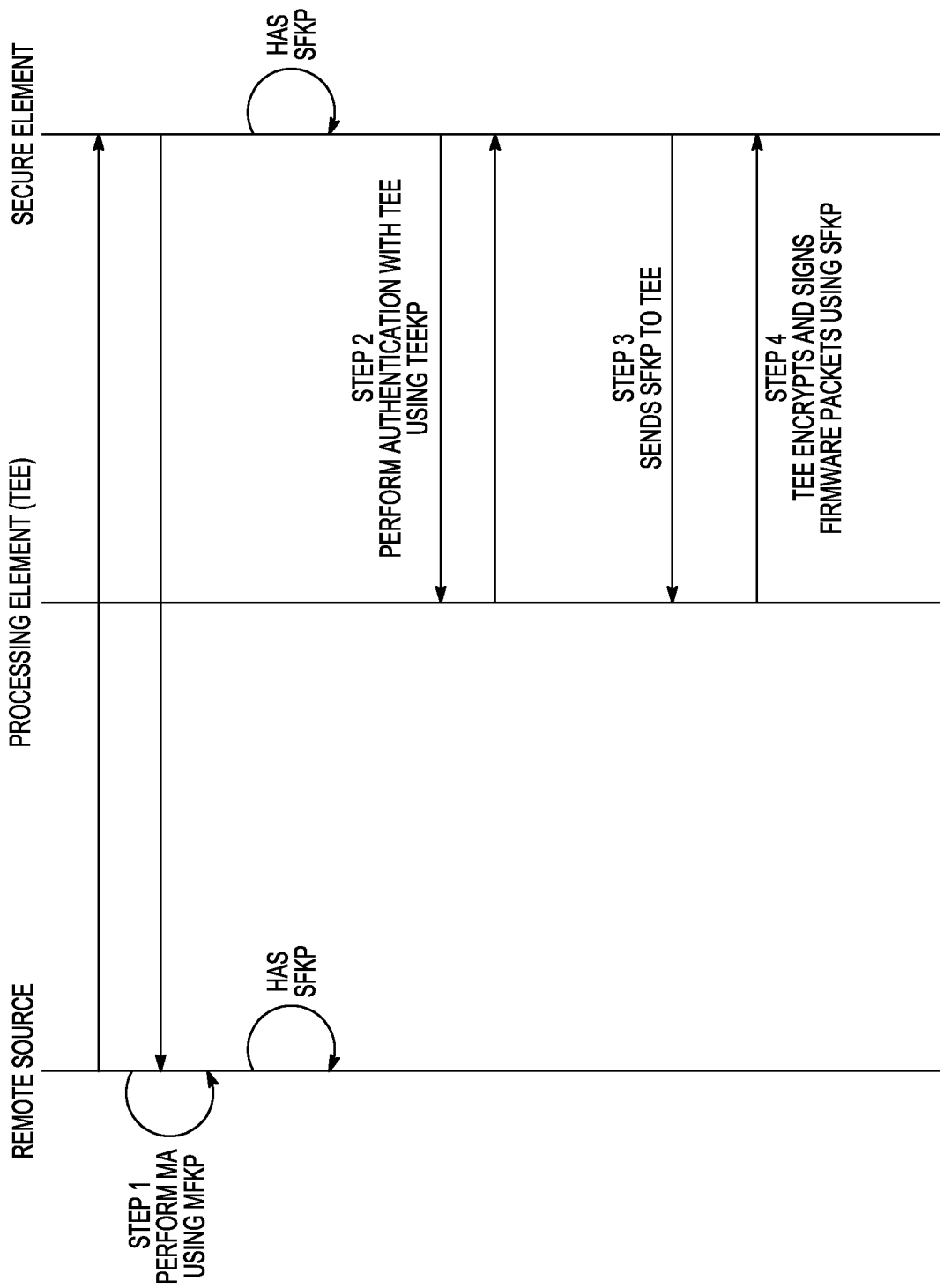

FIG. 2B shows another process for sending a firmware file to the first secure element 150 using a security enclave implemented by the processing element 130. As shown in FIG. 2B, initially the remote source 110 performs mutual authentication with the first secure element 150 using the MFKP of the first secure element 150. In this case, the remote source 110 needs to know the MFKP of the first secure element 150 that is the target of the firmware update. After performing mutual authentication with the first secure element 150, a pair of ephemeral session specific key material (SFKP) is generated and stored by the remote source 110 and the first secure element 150. After, before or concurrently with generating the SFKP, the first secure element 150 performs authentication (e.g., mutual authentication) with the security enclave implemented by the processing element 130 using the TEEKP of the security enclave. At this point, the first secure element 150 has the key material needed to communicate (exchange data with) the security enclave implemented by the processing element 130 and the first secure element 150 has generated the SFKP needed to exchange communications for the session.

According to this embodiment, the first secure element 150 sends the SFKP of the first secure element 150 to the security enclave implemented by the processing element 130 using the TEEKP of the security enclave. Specifically, the first secure element 150 encrypts and signs the SFKP of the first secure element 150 using the TEEKP of the security enclave implemented by the processing element 130. After the processing element 130 receives the SFKP from the remote source 110, the processing element 130 can decrypt the SFKP using the TEEKP and is then able to communicate with the first secure element 150 for the particular session using the decrypted SFKP of the first secure element 150. The remote source 130 transmits the firmware file with the firmware update to the processing element 130. The firmware file may be sent in encrypted or non-encrypted form. If sent in encrypted form, the remote source 130 encrypts the firmware file using the TEEKP of the security enclave implemented by the processing element 130. In some cases, the firmware file may be divided by the remote source 110 and sent to the processing element 130 in chunks from the remote source 110. In some cases, the firmware file may be sent in complete form from the remote source 110 and be completely stored on the processing element 130. In such cases, the processing element 130 divides the firmware file into chunks for transmission to the first secure element 150.

The security enclave implemented by the processing element 130 encrypts and signs each chunk of the firmware file using the SFKP of the first secure element 150 to generate respective data packets. The security enclave implemented by the processing element 130 provides the data packet (e.g., the encrypted and signed firmware file chunk) to the first secure element 150. The security enclave implemented by the processing element 130 repeats the process of encrypting and signing each chunk of the firmware file until all chunks have been sent to the first secure element 150. After all chunks of the firmware file are received by the first secure element 150, the SFKP becomes invalidated and/or deleted from being stored by the first secure element 150.

Figure 3:
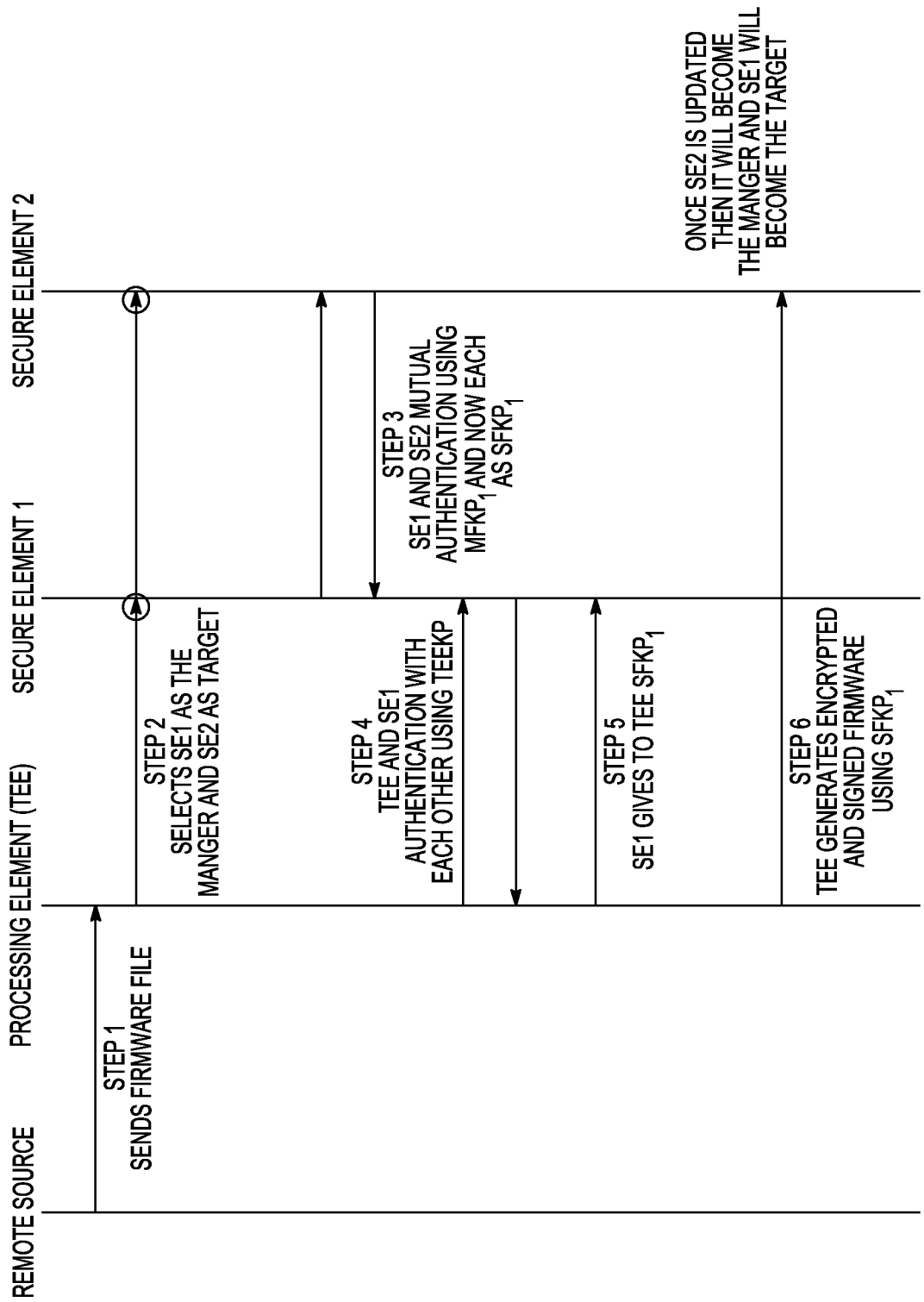

FIG. 3 shows another process for sending a firmware file to the first secure element 150 using two secure elements implemented on gateway 120 and a security enclave implemented by the processing element 130. In this process, a second secure element 152 is used to provide the SFKP of the first secure element 150 to the security enclave implemented by the processing element 130. This process avoids the need to have the remote source 110 maintain an MFKP for each target secure element it would like to update which reduces storage resources and secure key management requirements of the remote source 110. This process also avoids having the remote source 110 perform mutual authentication with the first secure element 150 to provide the firmware update which reduces the number of communications that are exchanged over a network and increases the overall efficiency and security of the system.

To implement the process shown in FIG. 3, each secure element implemented on gateway 120 stores a first MFKP for performing mutual authentication and generating an SFKP for its own communications and also stores a second MFKP of another secure element implemented on gateway 120. For example, first secure element 150 stores a first MFKP that is used by the crypto-processor of the first secure element 150 and also stores a second MFKP of a second secure element 152. In some cases, each secure element implemented by gateway 120 stores the MFKP for only one other secure element implemented by gateway 120. In some cases, each secure element implemented by gateway 120 stores the MFKP of every secure element implemented by gateway 120. Namely, if gateway 120 implements 16 different secure elements, each secure element stores 16 MFKP including the MFKP used by the respective crypto-processor of the secure element.

As shown in FIG. 3, the remote source 130 transmits the firmware file with the firmware update to the processing element 130. In some cases, the firmware file may be divided by the remote source 110 and sent to the processing element 130 in chunks from the remote source 110. In some cases, the firmware file may be sent in complete form from the remote source 110 and be completely stored on the processing element 130. In such cases, the processing element 130 divides the firmware file into chunks locally on the gateway 120.

After or before receiving the firmware file, the processing element 130 selects the first secure element 150 as a manager and the second secure element 152 as a target. The first secure element 150 performs mutual authentication with the second secure element 152 using the MFKP of the second secure element 152 that is stored on the first secure element 150. The mutual authentication between the two secure elements may be performed by the secure elements communicating directly with each other or by the secure elements exchanging communications via the processing element 130 and/or control circuitry 140. After performing mutual authentication with the first secure element 150, a first pair of ephemeral session specific key material ($SFKP_1$) is generated and stored by the first secure element 150 and by the second secure element 152. The first secure element 150 provides the $SFKP_1$ to the security enclave implemented by the processing element 130. Namely, the first secure element 150 performs mutual authentication with the security enclave implemented by the processing element 130 using the TEEKP of the security enclave implemented by the processing element 130. At this point, the first secure element 150 has the key material needed to communicate (exchange data) with the security enclave implemented by the processing element 130. The first secure element 150 encrypts and signs the $SFKP_1$ and provides the $SFKP_1$ to the security enclave implemented by the processing element 130 using the TEEKP of the security enclave.

The security enclave implemented by the processing element 130 provides each chunk of the firmware file to the second secure element (the target) 152 using the $SFKP_1$ the security enclave received from the first secure element (the manager) 150. Namely, the security enclave implemented by the processing element 130 encrypts and signs each chunk of the firmware file using the $SFKP_1$ of the second secure element 152 to generate respective data packets. The security enclave implemented by the processing element 130 provides data packet (e.g., the encrypted and signed firmware file chunk) to the second secure element 152. The security enclave implemented by the processing element 130 repeats the process of encrypting and signing each chunk of the firmware file until all chunks have been sent to the second secure element (the target) 152. After all chunks of the firmware file are received by the second secure element (the target) 152, the $SFKP_1$ becomes invalidated and/or deleted from being stored by the first and second secure elements 150 and 152 and by the security enclave implemented by the processing element 130.

At this point, after the second secure element 152 has been updated with the new firmware file, the security enclave implemented by the processing element 130 may designate the second secure element 152 as the manager and the first secure element 150 as the target. In this way, the security enclave implemented by the processing element 130 may be used to update the firmware of the first secure element 150 in the same manner. Namely, the first secure element 150 performs mutual authentication with the second secure element 152 using the MFKP of the second secure element 152 that is stored on the first secure element 150. The mutual authentication between the two secure elements may be performed by the secure elements communicating directly with each other or by the secure elements exchanging communications via the control circuitry 140 and/or the security enclave implemented by the processing element 130. After performing mutual authentication with the first secure element 150, a second pair of ephemeral session specific key material ($SFKP_2$) is generated and stored by the first secure element 150 and by the second secure element 152. The second secure element (the manager) 152 provides the $SFKP_2$ to the security enclave implemented by the processing element 130. Namely, the second secure element 152 performs mutual authentication with the security enclave implemented by the processing element 130 using the TEEKP of the security enclave implemented by the processing element 130. At this point, the second secure element 152 has the key material needed to communicate (exchange data) with the security enclave implemented by the processing element 130. The second secure element 152 encrypts and signs the $SFKP_2$ and provides the $SFKP_2$ to the security enclave implemented by the processing element 130 using the TEEKP of the security enclave.

The security enclave implemented by the processing element 130 provides each chunk of the firmware file to the first secure element 150 using the $SFKP_2$ the security enclave received from the second secure element 152. Namely, the security enclave implemented by the processing element 130 encrypts and signs each chunk of the firmware file using the $SFKP_2$ of the first secure element 150 to generate respective data packets. The security enclave implemented by the processing element 130 provides the data packet (e.g., the encrypted and signed firmware file chunk) to the first secure element 150. The security enclave implemented by the processing element 130 repeats the process of encrypting and signing each chunk of the firmware file until all chunks have been sent to the first secure element 150. After all chunks of the firmware file are received by the first secure element 150, the $SFKP_2$ becomes invalidated and/or deleted from being stored by the first and second secure elements 150 and 152 and by the security enclave implemented by the processing element 130.

Figure 4:
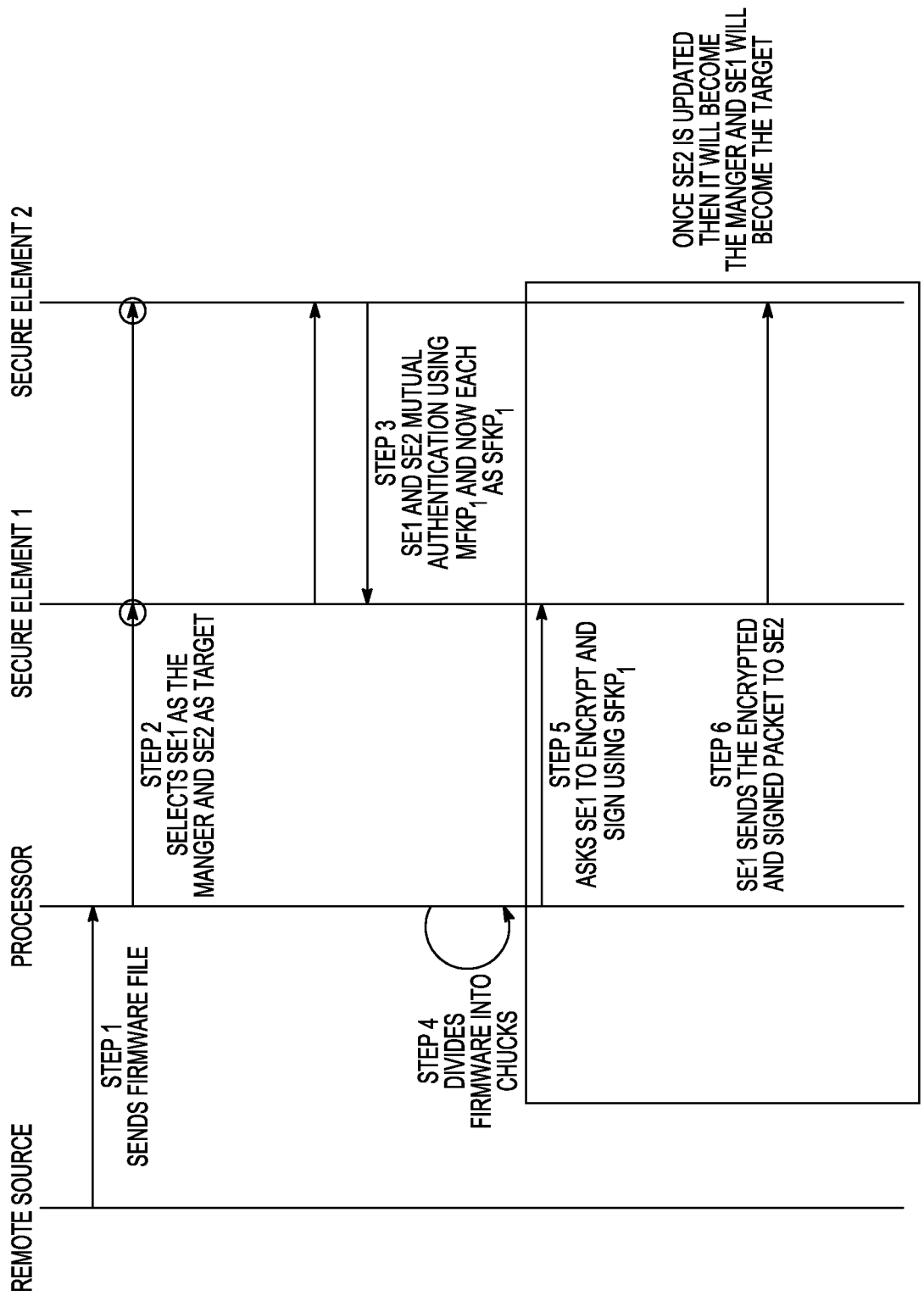

FIG. 4 shows another process for sending a firmware file to the first secure element 150 using two secure elements implemented on gateway 120 and the control circuitry 140. In this process, the processing element 130 implements a given secure element (e.g., the second secure element 152). Namely, all of the functionality of the second secure element 152 is embodied by the processing element 130 even though they are drawn as separate boxes in FIG. 1. In this process, a second secure element 152 is used to locally generate the SFKP of the first secure element 150 and securely provides firmware chunks to the first secure element 150. This process avoids the need to have the remote source 110 maintain an MFKP for each target secure element it would like to update which reduces storage resources of the remote source 110. This process also avoids having the remote source 110 perform mutual authentication with the first secure element 150 to provide the firmware update which reduces the number of communications that are exchanged over a network and increases the overall efficiency and security of the system. This process also avoids the need to have ephemeral session specific key material communicated or exchanged with another device (e.g., another processor or controller on the gateway 120).

To implement the process shown in FIG. 4, each secure element implemented on gateway 120 stores a first MFKP for performing mutual authentication and generating an SFKP for its own communications and also stores a second MFKP of another secure element implemented on gateway 120. For example, first secure element 150 stores a first MFKP that is used by the crypto-processor of the first secure element 150 and also stores a second MFKP of a second secure element 152. In some cases, each secure element implemented by gateway 120 stores the MFKP for only one other secure element implemented by gateway 120. In some cases, each secure element implemented by gateway 120 stores the MFKP of every secure element implemented by gateway 120. Namely, if gateway 120 implements 16 different secure elements, each secure element stores 16 MFKP including the MFKP used by the respective crypto-processor of the secure element.

As shown in FIG. 4, the remote source 130 transmits the firmware file with the firmware update to the control circuitry 140. Control circuitry 140 may be any suitable processor and may or may not implement a security enclave. In some cases, the firmware file may be divided by the remote source 110 and sent to the control circuitry 140 in chunks from the remote source 110. In some cases, the firmware file may be sent in complete form from the remote source 110 and be completely stored on the control circuitry 140. In such cases, the control circuitry 140 divides the firmware file into chunks locally on the gateway 120.

After or before receiving the firmware file, the control circuitry 140 selects the first secure element 150 as a manager and the second secure element 152 as a target. The first secure element 150 performs mutual authentication with the second secure element 152 using the MFKP of the second secure element 152 that is stored on the first secure element 150. The mutual authentication between the two secure elements may be performed by the secure elements communicating directly with each other or indirectly by the secure elements exchanging communications via the control circuitry 140. After performing mutual authentication with the first secure element 150, a first pair of ephemeral session specific key material (SFKP$_1$) is generated and stored by the first secure element 150 and by the second secure element 152. At this point, the first and second secure elements 150 and 152 are able to securely exchange data that is encrypted and signed using the SFKP$_1$.

The control circuitry 140 provides each chunk of the firmware file to the first secure element 150. The first secure element 150 encrypts and signs each chunk of the firmware file received from the element 150 using the SFKP$_1$ of the second secure element 152 to generate respective data packets. Namely, the first secure element 150 provides the data packet (e.g., the encrypted and signed firmware file chunk) to the second secure element 152 either directly or indirectly via the control circuitry 140. In the case of sending the data packet (e.g., the encrypted and signed file chunk) indirectly, the first secure element 150 returns to the control circuitry 140 the data packet that includes the file chunk that has been encrypted and signed using the SFKP$_1$ of the second secure element 152. Then, the element 150 sends the data packet to the second secure element 152. Namely, the element 150 may act as a blind and dumb conduit of data exchanged between the first and second secure elements 150 and 152. The first secure element 150 repeats the process of encrypting and signing each chunk of the firmware file until all chunks have been sent to the second secure element 152. After all chunks of the firmware file are received by the second secure element 152, the SFKP$_1$ becomes invalidated and/or deleted from being stored by the first and second secure elements 150 and 152.

At this point, after the second secure element 152 has been updated with the new firmware file, the control circuitry 140 may designate the second secure element 152 as the manager and the first secure element 150 as the target. In this way, the second secure element 152 may be used to update the firmware of the first secure element 150 in the same manner. Namely, the second secure element 152 performs mutual authentication with the first secure element 150 using the MFKP of the first secure element 150 that is stored on the second secure element 152. The mutual authentication between the two secure elements may be performed by the secure elements communicating directly with each other or indirectly by the secure elements exchanging communications via the control circuitry 140. After performing mutual authentication with the second secure element 152, a second pair of ephemeral session specific key material (SFKP$_2$) is generated and stored by the first secure element 150 and by the second secure element 152. At this point, the first and second secure elements 150 and 152 are able to securely exchange data that is encrypted and signed using the SFKP$_2$.

The control circuitry 140 provides each chunk of the firmware file to the second secure element 152. The second secure element 152 encrypts and signs each chunk of the firmware file received from the element 150 using the SFKP$_2$ of the first secure element 150 to generate respective data packets. The second secure element 152 provides the data packet (e.g., the encrypted and signed firmware file chunk) to the first secure element 150 either directly or indirectly via the control circuitry 140. The second secure element 152 repeats the process of encrypting and signing each chunk of the firmware file until all chunks have been sent to the first secure element 150. After all chunks of the firmware file are received by the first secure element 150, the SFKP$_2$ becomes invalidated and/or deleted from being stored by the first and second secure elements 150 and 152.

Figure 5:
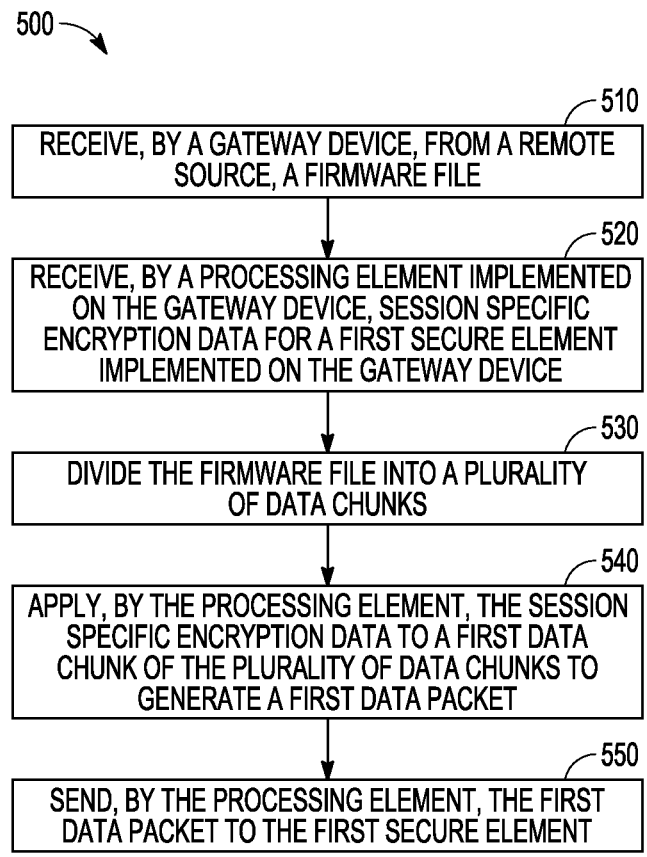
FIG. 5 is a flow diagram depicting an example process for updating a secure element in accordance with various embodiments.

FIG. 5 is a flow diagram depicting an example process 500 for updating firmware of a secure element in accordance with various embodiments.

At operation 510, a gateway device receives from a remote source, a firmware file.

At operation 520, a processing element implemented on the gateway device receives ephemeral session specific key material for a first secure element implemented on the gateway device.

At operation 530, the firmware file is divided into a plurality of data chunks.

At operation 540, the processing element applies the ephemeral session specific key material to a first data chunk of the plurality of data chunks to generate a first data packet.

At operation 550, the processing element sends the first data packet to the first secure element.

Figure 6:
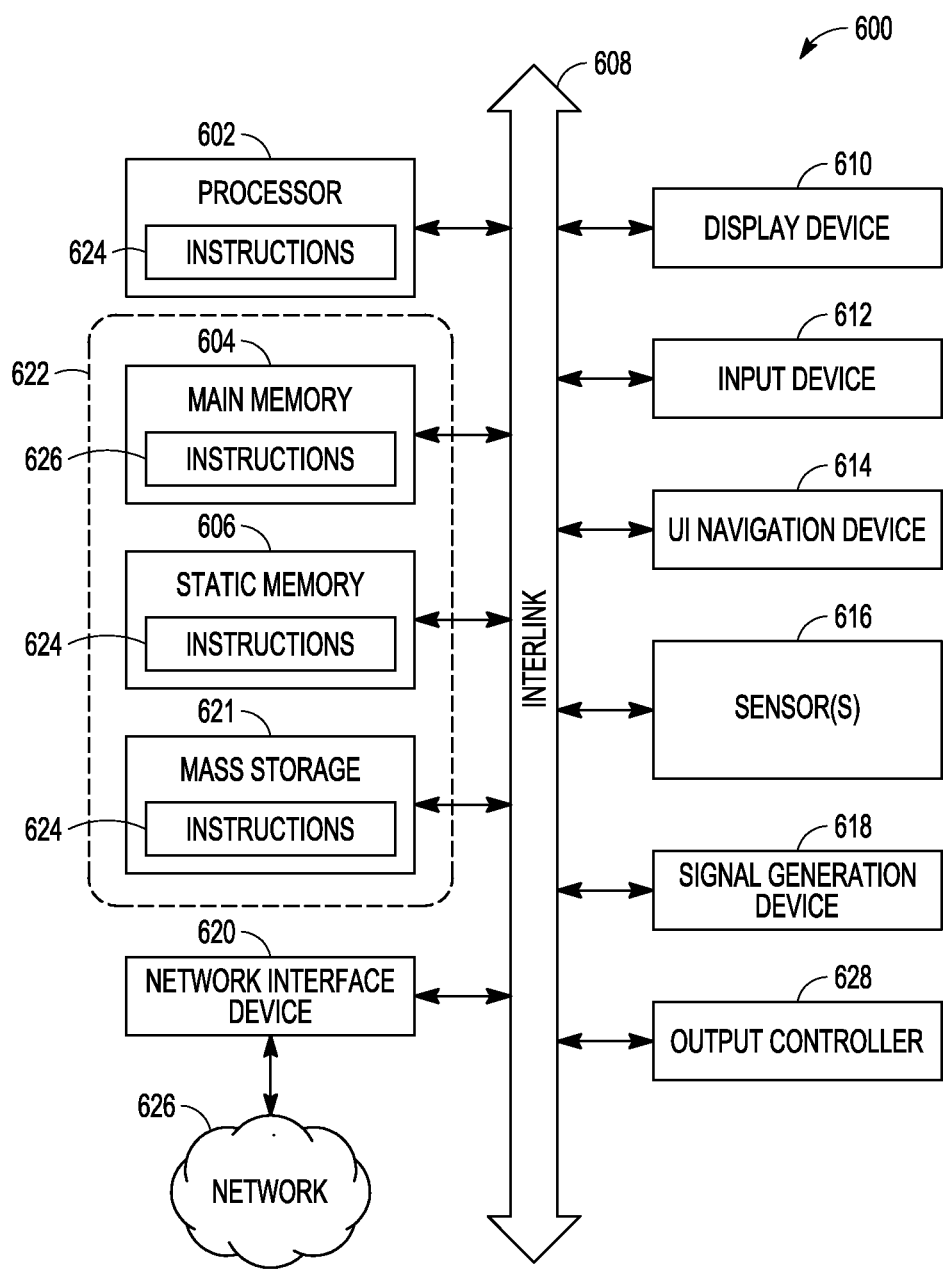
FIG. 6 is a block diagram illustrating an example of a machine upon which one or more embodiments may be implemented.

FIG. 6 is a block diagram of an example machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in a peer-to-peer (P2P) (or other distributed) network environment. The machine 600 may be a personal computer (PC), a tablet PC, a set-top box (STB), a personal digital assistant (PDA), a mobile telephone, a web appliance, an IoT device, an automotive system, an aerospace system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant-massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 600 may include a hardware processor 602 (e.g., a central processing unit (CPU), a graphics processing unit (GPU), a hardware processor core, or any combination thereof, such as a memory controller, etc.), a main memory 604, and a static memory 606, some or all of which may communicate with each other via an interlink (e.g., bus) 608. The machine 600 may further include a display device 610, an alphanumeric input device 612 (e.g., a keyboard), and a user interface (UI) navigation device 614 (e.g., a mouse). In an example, the display device 610, alphanumeric input device 612, and UI navigation device 614 may be a touchscreen display. The machine 600 may additionally include a storage device 622 (e.g., drive unit); a signal generation device 618 (e.g., a speaker); a network interface device 620; one or more sensors 616, such as a Global Positioning System (GPS) sensor, wing sensors, mechanical device sensors, temperature sensors, ICP sensors, bridge sensors, audio sensors, industrial sensors, a compass, an accelerometer, or other sensors; and one or more system-in-package data acquisition devices 690. The system-in-package data acquisition device(s) 690 may implement some or all of the functionality of the offset calibration system 100. The machine 600 may include an output controller 628, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage device 622 may include a machine-readable medium on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 621 may constitute the machine-readable medium.

While the machine-readable medium is illustrated as a single medium, the term "machine-readable medium" may include a single medium or multiple media (e.g., a centralized or distributed database, or associated caches and servers) configured to store the one or more instructions 624.

The term "machine-readable medium" may include any transitory or non-transitory medium that is capable of storing, encoding, or carrying transitory or non-transitory instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 (e.g., software, programs, an operating system (OS), etc.) or other data that are stored on the storage device 621 can be accessed by the main memory 604 for use by the hardware processor 602. The main memory 604 (e.g., DRAM) is typically fast, but volatile, and thus a different type of storage from the storage device 621 (e.g., an SSD), which is suitable for long-term storage, including while in an "off" condition. The instructions 624 or data in use by a user or the machine 600 are typically loaded in the main memory 604 for use by the hardware processor 602. When the main memory 604 is full, virtual space from the storage device 621 can be allocated to supplement the main memory 604; however, because the storage device 621 is typically slower than the main memory 604, and write speeds are typically at least twice as slow as read speeds, use of virtual memory can greatly reduce user experience due to storage device latency (in contrast to the main memory 604, e.g., DRAM). Further, use of the storage device 621 for virtual memory can greatly reduce the usable lifespan of the storage device 621.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, peer-to-peer (P2P) networks), among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible or intangible medium that is capable of storing, encoding, or carrying instructions for execution by the machine 600, and includes digital or analog communications signals or other tangible or intangible media to facilitate communication of such software.

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the inventive subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended; that is, a system, device, article, composition, formulation, or process that includes elements in addition to those listed after such a term in a claim are still deemed to fall within the scope of that claim. Moreover, in the following claims, the terms "first," "second," "third," etc., are used merely as labels, and are not intended to impose numerical requirements on their objects.

Method examples described herein may be machine- or computer-implemented at least in part. Some examples may include a computer-readable medium or machine-readable medium encoded with transitory or non-transitory instructions operable to configure an electronic device to perform methods as described in the above examples. An implementation of such methods may include code, such as microcode, assembly-language code, a higher-level-language code, or the like. Such code may include transitory or non-transitory computer-readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above detailed description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the detailed description as examples or embodiments, with each claim standing on its own as a separate embodiment, and it is contemplated that such embodiments may be combined with each other in various combinations or permutations. The scope of the inventive subject matter should be determined with reference to the appended claims, along with the full scope of equivalents to which such claims are entitled.

What is claimed is:

1. A method for updating firmware on a secure element, the method comprising:
   receiving, by a gateway device, from a remote source, a firmware file, the gateway device comprising a plurality of secure elements including a first secure element and a second secure element;
   securely receiving, by a processing element implemented on the gateway device, an ephemeral session specific key material for the first secure element of the plurality of secure elements implemented on the gateway device, wherein the ephemeral session specific key material is generated in response to mutual authentication with the first secure element using a key associated with the first secure element;
   dividing, by the gateway device, the firmware file into a plurality of data chunks;
   causing, by the processing element, the second secure element to encrypt packets of the plurality of data chunks of the firmware file using the ephemeral session specific key material and to send the encrypted packets of the plurality of data chunks of the firmware file to the first secure element of the plurality of secure elements;
   after the encrypted packets of the plurality of data chunks of the firmware file have been sent to the first secure element of the plurality of secure elements, securely receiving, by the processing element, a subsequent ephemeral session specific key material for the second secure element of the plurality of secure elements implemented on the gateway device, wherein the subsequent ephemeral session specific key material is generated in response to mutual authentication with the second secure element using another key associated with the second secure element; and
   causing, by the processing element, the first secure element to subsequently encrypt packets of the plurality of data chunks of the firmware file using the subsequent ephemeral session specific key and to send the subsequently encrypted packets to the second secure element.

2. The method of claim 1, further comprising:
   after performing the mutual authentication, encrypting a first data chunk using the ephemeral session specific key material to generate a first data packet, wherein the ephemeral session specific key material comprises an encryption key and a signature key, the encryption key being used to encrypt underlying data and the signature key being used to sign the encrypted data, wherein the ephemeral session specific key material is invalidated after a session between the processing element and the first secure element ends.

3. The method of claim 2, wherein the first data packet is generated by encrypting and signing the first data chunk using the encryption key and the signature key in the ephemeral session specific key material.

4. The method of claim 1, further comprising:
performing mutual authentication between the remote source and the first secure element to generate the ephemeral session specific key material; and
transmitting, from the remote source to the processing element, the ephemeral session specific key material that has been generated in response to performing the mutual authentication between the remote source and the first secure element.

5. The method of claim 1, wherein the processing element comprises a security enclave, further comprising:
establishing the ephemeral session specific key material between the first secure element and the remote source, the establishing being performed based on a master firmware key pair associated with the first secure element, wherein the firmware file is divided by the processing element.

6. The method of claim 5, wherein the security enclave is a trusted execution environments device, and wherein the master firmware key pair is stored on the remote source, further comprising:
establishing a processing element key pair between the remote source and the processing element; and
sending the ephemeral session specific key material from the remote source to the processing element using the processing element key pair.

7. The method of claim 5, further comprising:
establishing a processing element key pair between the first secure element and the processing element; and
sending the ephemeral session specific key material from the first secure element to the processing element using the processing element key pair.

8. The method of claim 1, wherein the processing element comprises a security enclave, and wherein the firmware file is divided by the processing element, further comprising:
selecting, by the processing element, the second secure element as a manager and the first secure element as a target;
establishing the ephemeral session specific key material between the first secure element and the second secure element, the establishing being performed based on a first master firmware key pair associated with the first secure element;
establishing a processing element key pair between the second secure element and the processing element; and
sending the ephemeral session specific key material from the second secure element to the processing element using the processing element key pair, wherein the security enclave is a trusted execution environments device, wherein the first master firmware key pair is stored on the second secure element, and wherein a second master firmware key pair associated with the second secure element is stored on the first secure element.

9. The method of claim 8, further comprising:
updating firmware of the second secure element after the firmware file is transmitted to the first secure element.

10. The method of claim 9, wherein the ephemeral session specific key material is a first ephemeral session specific key material, further comprising:
selecting, by the processing element, the second secure element as the target and the first secure element as the manager;
establishing a second ephemeral session specific key material between the first secure element and the second secure element, the establishing being performed based on a second master firmware key pair associated with the second secure element;
establishing a processing element key pair between the first secure element and the processing element; and
sending the second ephemeral session specific key material from the first secure element to the processing element using the processing element key pair.

11. The method of claim 10, further comprising sending, by the processing element, a first data packet to the second secure element based on the second ephemeral session specific key material.

12. The method of claim 1, wherein the processing element comprises a second secure element, and wherein the firmware file is divided by a processor on the gateway device, further comprising:
receiving by the processor the firmware file;
selecting, by the processor, the second secure element as a manager and the first secure element as a target;
establishing the ephemeral session specific key material between the first secure element and the second secure element, the establishing being performed based on a first master firmware key pair associated with the first secure element;
providing a first data chunk from the processor to the second secure element; and
instructing the second secure element to apply the ephemeral session specific key material to the first data chunk to send a first data packet, directly or indirectly, to the first secure element.

13. The method of claim 12, further comprising:
updating firmware of the second secure element after the firmware file is transmitted to the first secure element, wherein the ephemeral session specific key material is a first ephemeral session specific key material;
selecting, by the processor, the second secure element as the target and the first secure element as the manager;
establishing a second ephemeral session specific key material between the first secure element and the second secure element, the establishing being performed based on a second master firmware key pair associated with the second secure element;
providing the first data chunk from the processor to the first secure element; and
instructing the first secure element to apply the second ephemeral session specific key material to the first data chunk to send the first data packet, directly or indirectly, to the second secure element.

14. The method of claim 13, further comprising sending, by the processing element, the first data packet to the second secure element based on the second ephemeral session specific key material.

15. A system for updating firmware on a secure element, the system comprising:
a gateway device configured to receive, from a remote source, a firmware file and divide the firmware file into a plurality of data chunks, the gateway device comprising a plurality of secure elements including a first secure element and a second secure element; and a processing element implemented on the gateway device and configured to:

securely receive an ephemeral session specific key material for the first secure element implemented on the gateway device, wherein the ephemeral session specific key material is generated in response to mutual authentication with the first secure element using a key associated with the first secure element;

cause, by the processing element, the second secure element to encrypt packets of the plurality of data chunks of the firmware file using the ephemeral session specific key material and to send encrypted packets of the plurality of data chunks of the firmware file to the first secure element of the plurality of secure elements; and after the encrypted packets of the plurality of data chunks of the firmware file have been sent to the first secure element of the plurality of secure elements, securely receive, by the processing element, a subsequent ephemeral session specific key material for the second secure element of the plurality of secure elements implemented on the gateway device, wherein the subsequent ephemeral session specific key material is generated in response to mutual authentication with the second secure element using another key associated with the second secure element; and cause, by the processing element, the first secure element to subsequently encrypt packets of the plurality of data chunks of the firmware file using the subsequent ephemeral session specific key material and to send the subsequently encrypted packets of the plurality of data chunks of the firmware file to the second secure element of the plurality of secure elements.

16. The system of claim 15, wherein the ephemeral session specific key material comprises an encryption key and a signature key, the encryption key being used to encrypt underlying data and the signature key being used to sign the encrypted data.

17. The system of claim 16, wherein the first data packet is generated by encrypting and signing a first data chunk using the encryption key and the signature key in the ephemeral session specific key material.

18. The system of claim 15, wherein the processing element comprises a security enclave and is configured to: establish the ephemeral session specific key material between the first secure element and the remote source, the establishing being performed based on a master firmware key pair associated with the first secure element, wherein the firmware file is divided by the processing element.

19. A non-transitory computer-readable medium comprising instructions that, when executed by one or more processors, configure the one or more processors to perform operations for updating firmware on a secure element comprising:

receiving, by a gateway device, from a remote source, a firmware file, the gateway device comprising a plurality of secure elements including a first secure element and a second secure element;

securely receiving, by a processing element implemented on the gateway device, an ephemeral session specific key material for the first secure element implemented on the gateway device, wherein the ephemeral session specific key material is generated in response to mutual authentication with the first secure element using a key associated with the first secure element;

dividing, by the gateway device, the firmware file into a plurality of data chunks;

causing, by the processing element, the second secure element to encrypt packets of the plurality of data chunks of the firmware file using the ephemeral session specific key material and to send the encrypted packets of the plurality of data chunks of the firmware file to the first secure element of the plurality of secure elements;

after the encrypted packets of the plurality of data chunks of the firmware file have been sent to the first secure element of the plurality of secure elements, securely receiving, by the processing element, a subsequent ephemeral session specific key material for the second secure element of the plurality of secure elements implemented on the gateway device, wherein the subsequent ephemeral session specific key material is generated in response to mutual authentication with the second secure element using another key associated with the second secure element;

causing, by the processing element, the first secure element to subsequently encrypt packets of the plurality of data chunks of the firmware file using the subsequent ephemeral session specific key and to send the subsequently encrypted packets to the second secure element.

* * * * *